United States Patent
Hata et al.

(10) Patent No.: US 9,529,462 B2
(45) Date of Patent: Dec. 27, 2016

(54) TOUCH PANEL

(71) Applicant: Sharp Kabushiki Kaisha, Osaka-shi, Osaka (JP)

(72) Inventors: Masayuki Hata, Osaka (JP); Kohji Yabuta, Osaka (JP); Kosuke Nagata, Osaka (JP); Shinichi Miyazaki, Osaka (JP); Tomotoshi Tsujioka, Osaka (JP); Mikihiro Noma, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 18 days.

(21) Appl. No.: 14/438,317

(22) PCT Filed: Oct. 28, 2013

(86) PCT No.: PCT/JP2013/079085
§ 371 (c)(1),
(2) Date: Apr. 24, 2015

(87) PCT Pub. No.: WO2014/069387
PCT Pub. Date: May 8, 2014

(65) Prior Publication Data
US 2015/0253809 A1    Sep. 10, 2015

(30) Foreign Application Priority Data
Oct. 29, 2012  (JP) .................. 2012-237688

(51) Int. Cl.
*G06F 3/041*  (2006.01)
*G02F 1/1362*  (2006.01)
*G06F 3/044*  (2006.01)

(52) U.S. Cl.
CPC ......... *G06F 3/041* (2013.01); *G02F 1/136204* (2013.01); *G06F 3/044* (2013.01); *G06F 2203/04107* (2013.01)

(58) Field of Classification Search
CPC ............ G02F 1/133512; G02F 1/13452; G02F 1/13338; G02F 1/133345; G02F 1/133308; G02F 2001/133311; G02F 2001/133325; G02F 1/135; G06F 3/044; G06F 3/04; G06F 2203/04103; G06F 3/0412; G06F 2203/04107
See application file for complete search history.

(56) References Cited

U.S. PATENT DOCUMENTS

2010/0001973 A1* 1/2010 Hotelling ............ G02F 1/13338
                                                345/174
2010/0220071 A1   9/2010 Nishihara et al.
(Continued)

FOREIGN PATENT DOCUMENTS

| JP | 2010-218542 A | 9/2010 |
| JP | 2011-048780 A | 3/2011 |
| JP | 2011-090430 A | 5/2011 |

OTHER PUBLICATIONS

Official Communication issued in International Patent Application No. PCT/JP2013/079085, mailed on Jan. 21, 2014.

*Primary Examiner* — Sanjiv D Patel
(74) *Attorney, Agent, or Firm* — Keating & Bennett, LLP

(57) ABSTRACT

A touch panel (2) includes: a glass substrate (4); X-direction electrodes and Y-direction electrodes (14) provided above the glass substrate (4); lines (15) provided above the glass substrate (4) and electrically connected with the X- and Y-direction electrodes (14); an insulating resin layer (12) covering the X- and Y-direction electrodes (14) and lines (15); and a conductive layer (23) provided above the insulating resin layer (12) to allow static electricity entering the panel from the outside to flow therethrough.

11 Claims, 5 Drawing Sheets

(56) References Cited

U.S. PATENT DOCUMENTS

| | | | |
|---|---|---|---|
| 2011/0018560 A1* | 1/2011 | Kurashima | G06F 3/044 324/679 |
| 2011/0050636 A1 | 3/2011 | Nagata et al. | |
| 2011/0090159 A1* | 4/2011 | Kurashima | G06F 3/044 345/173 |
| 2012/0120011 A1* | 5/2012 | Teng | G06F 3/044 345/173 |
| 2012/0235927 A1* | 9/2012 | Ho | G06F 3/044 345/173 |
| 2013/0168147 A1* | 7/2013 | Kohara | G06F 3/041 174/260 |
| 2013/0329171 A1* | 12/2013 | Xu | G02F 1/134363 349/106 |
| 2014/0071384 A1* | 3/2014 | Ho | G02F 1/136204 349/106 |

* cited by examiner

| CONVENTIONAL ARRANGEMENT (WITHOUT CONDUCTIVE LAYER) | PRESENT EMBODIMENT (WITH CONDUCTIVE LAYER) |
|---|---|
| 6 kV | 10 kV |

| | CONVENTIONAL ARRANGEMENT (WITHOUT CONDUCTIVE LAYER) | PRESENT EMBODIMENT (WITH CONDUCTIVE LAYER) |
|---|---|---|
| AERIAL DISCHARGE | 6 kV | 16 kV |
| CONTACT DISCHARGE | 3 kV | 4 kV |

TOUCH PANEL

TECHNICAL FIELD

The present invention relates to a touch panel that can determine a touch position on the operation surface.

BACKGROUND ART

Touch panels that can determine the position at which a stylus, finger or the like touches the operation surface, i.e. a touch position, are known. As disclosed in JP 2010-218542 A, for example, such a touch panel includes detection electrodes extending in X and Y directions to form a detection region, line electrodes forming a line region, and shielding electrodes surrounding a region that includes the detection region and line region. The detection electrodes, line electrodes and shielding electrodes are all provided on a substrate. The shielding electrodes are connected with GND terminals.

In the above arrangement, the shielding electrodes can shield against static electricity entering the edges of the substrate, i.e. the outermost portions as measured in a plane direction of the substrate.

CONVENTIONAL ART DOCUMENTS

Patent Documents

Patent Document 1: JP 2010-218542 A

SUMMARY OF THE INVENTION

Problems to be Solved by the Invention

In the arrangement disclosed in JP 2010-218542 A, shielding electrodes are provided above the substrate to surround the region with the detection electrodes and line electrodes. This requires a region above the substrate in which shielding electrodes are to be formed that surrounds the region with the detection electrodes and line electrodes.

Thus, the above arrangement requires a large picture frame region provided around the detection region of the touch panel. This increases the entire size of the touch panel.

An object of the present invention is to provide a compact touch panel that can prevent static electricity from being transmitted to electrodes or lines.

Means to Solve the Problems

A touch panel according to an embodiment of the present invention includes: a substrate; a plurality of electrodes provided above the substrate; lines provided above the substrate and each electrically connected with one of the plurality of electrodes; an insulating layer covering the electrodes and the lines; and a conductive layer provided above the insulating layer to allow static electricity entering the touch panel from the outside to flow therethrough.

Effects of the Invention

The touch panel according to an embodiment of the present invention provides a compact arrangement that can prevent static electricity from being transmitted to electrodes or lines.

EMBODIMENTS FOR CARRYING OUT THE INVENTION

Figure 1:
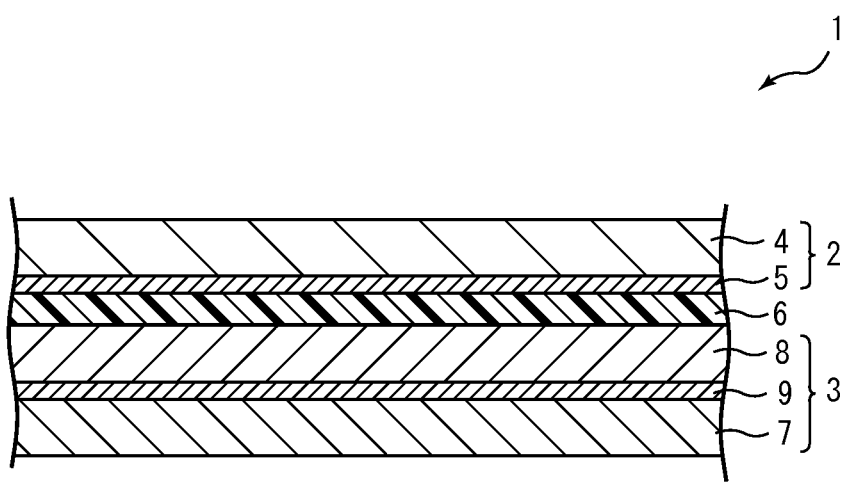
FIG. 1 is a schematic view of a touch panel-equipped liquid crystal display device including a touch panel according to Embodiment 1.

A touch panel according to an embodiment of the present invention includes: a substrate; a plurality of electrodes provided above the substrate; lines provided above the substrate and each electrically connected with one of the plurality of electrodes; an insulating layer covering the electrodes and the lines; and a conductive layer provided above the insulating layer to allow static electricity entering the touch panel from the outside to flow therethrough (first arrangement).

In the above arrangement, the conductive layer is provided above the insulating layer that covers the electrodes and lines. Thus, the size of the picture frame region of the touch panel may be reduced compared with conventional arrangements where a shielding electrode is provided around the region with the electrodes and lines. That is, stacking a conductive layer above the insulating layer such that they are arranged in their thickness direction, as in the above arrangement, reduces the size of the touch panel as measured in a plane direction compared with implementations where a conductive layer is disposed in a plane direction of the insulating layer with a distance equal to the minimum distance between the conductive layer and electrodes or lines of the present arrangement. Thus, the above arrangement reduces the entire size of the touch panel.

Further, in the above arrangement, static electricity entering the touch panel from the outside flows in the conductive layer above the insulating layer. This prevents static electricity from flowing in electrodes or lines of the touch panel. This protects the touch panel from static electricity.

Starting from the first arrangement, it is preferable that the conductive layer is provided along the periphery of the substrate (second arrangement). This further ensures that static electricity entering the touch panel from the outside flows in the conductive layer. This prevents static electricity from flowing in electrodes or lines of the touch panel in a more reliable manner.

Starting from the first or second arrangement, it is preferable that a high-resistance layer is further included between the insulating layer and the conductive layer (third arrangement). Providing a high-resistance layer between the insulating layer and conductive layer prevents static electricity flowing in the conductive layer from being discharged to electrodes or lines beyond the insulating layer. This prevents static electricity from flowing in electrodes or lines of the touch panel in a more reliable manner. The high-resistance layer may be made of a material having a resistance that is equal to that of the insulating layer or higher than that of the insulating layer, for example.

Starting from the second arrangement, it is preferable that the conductive layer includes a first conductive portion located above the insulating layer and a second conductive portion electrically connected with the first conductive portion and located outwardly of the insulating layer in a plane direction thereof (fourth arrangement).

This further ensures that static electricity entering the touch panel from the outside flows to the conductive layer through the second conductive portion located outwardly of the insulating layer in a plane direction thereof.

Starting from any one of the first to fourth arrangements, it is preferable that the lines include driving lines and detection lines, the conductive layer includes a driving conductive layer portion overlying the driving lines in plan view and a detection conductive layer portion overlying the detection lines, and the driving conductive layer portion and the detection conductive layer portion are electrically independent from each other (fifth arrangement).

This prevents static electricity entering the driving conductive layer portion from flowing into the detection conductive layer portion as noise, or prevents static electricity entering the detection conductive layer portion from flowing into the driving conductive layer portion as noise. That is, static electricity entering the driving conductive layer portion for the driving lines is prevented from affecting detection lines, and static electricity entering the detection conductive layer portion for the detection lines is prevented from affecting driving lines.

Starting from any one of the first to fifth arrangements, it is preferable that the substrate is a protective plate located at an operation surface (sixth arrangement). If the substrate also serves as a protective plate located at the operation surface of the touch panel, the distance between the outer surface of the substrate (i.e. the contact surface of the touch panel) and the electrodes or lines is smaller than that for implementations where a substrate and protective plate are separate elements. Providing a conductive layer of the above first to fifth arrangements in such an arrangement prevents static electricity from flowing in electrodes or lines of the touch panel.

Preferred embodiments of the touch panel will be described below with reference to the drawings. The sizes of the components in the drawings do not exactly represent the sizes or size ratios of actual components.

Embodiment 1

FIG. 1 schematically illustrates a touch panel-equipped liquid crystal display device 1 including a touch panel 2 according to Embodiment 1. As shown in FIG. 1, in the touch panel-equipped liquid crystal display device 1, the touch panel 2 that can determine a touch position is stacked on the liquid crystal panel 3 that can display an image. In FIG. 1, numeral 6 indicates a transparent adhesion layer for bonding the touch panel 2 and liquid crystal panel 3. In FIG. 1, the backlight and other components that are stacked on the liquid crystal panel 3 are not shown.

The liquid crystal panel 3 includes an active-matrix substrate 7 having a large number of pixels arranged in a matrix, a counter-substrate 8 having a side facing the active-matrix substrate 7, and a liquid crystal layer 9 located between the active-matrix substrate 7 and counter-substrate 8. The construction of the liquid crystal panel 3 is the same as that of conventional liquid crystal panels, and thus will not be described in detail.

The touch panel 2 includes a glass substrate 4 and a laminated film 5 provided above the glass substrate 4. The glass substrate 4 also serves as a protective plate for the touch panel 2. As the glass substrate 4 of the touch panel 2 also serves as a protective plate, the entire thickness of the touch panel may be made smaller than that of implementations including a protective plate separate from the substrate.

Figure 2:
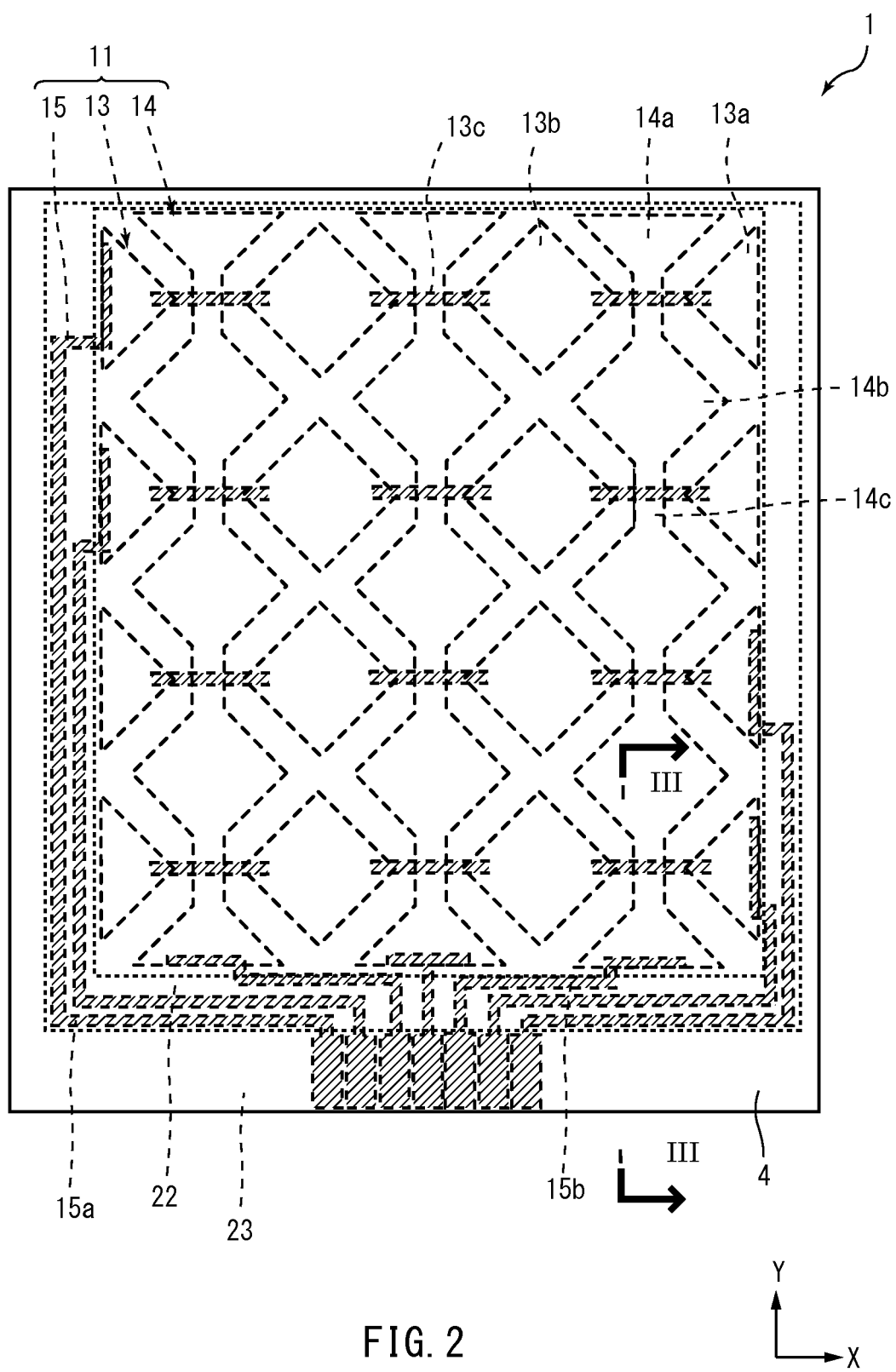
FIG. 2 is a schematic plan view of the touch panel-equipped liquid crystal display device.
Figure 3:
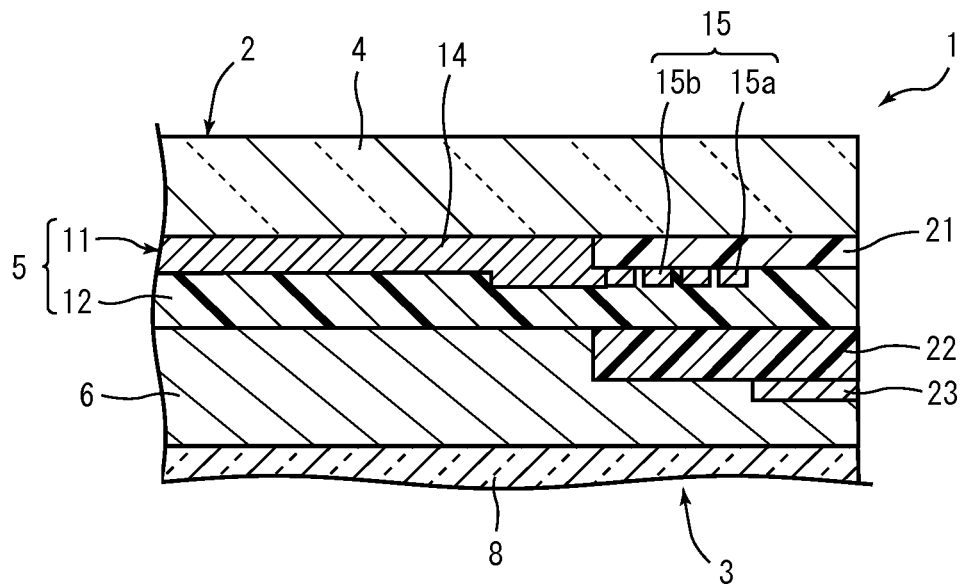
FIG. 3 is a cross-sectional view taken along line III-III of FIG. 2.

As described further below in detail, the laminated film 5 includes a transparent conductive film 11 provided above the glass substrate 4 and constituting electrodes 13 and 14 and lines 15 (see FIG. 2), and an insulating resin layer 12 covering the electrodes 13 and 14 and lines 15 (see FIG. 3).

The transparent conductive film 11 is formed above the glass substrate 4 from a transparent conductive material such as ITO. As shown in FIG. 2, the transparent conductive film 11 includes X-direction electrodes 13 extending in the X-direction, Y-direction electrodes 14 extending in the Y-direction, and lines 15 electrically connected with the X-direction electrodes 13 and Y-direction electrodes 14. As shown in FIG. 2, the X-direction electrodes 13 cross the Y-direction electrodes 14. For example, in the present embodiment, a predetermined voltage is applied to the X-direction electrodes 13. Thus, when a finger or the like of the operator comes in contact with the touch panel 2, the electrostatic capacitance between the X-direction electrode 13 and Y-direction electrode 14 at this contact position changes. This change in electrostatic capacitance is provided to a controller, not shown, in the form of a signal from the Y-direction electrode 14 to allow the controller to determine the touch position.

As shown in FIG. 2, each of the X-direction electrodes 13 includes generally triangular electrode pads 13a, generally quadrangular electrode pads 13b, and bridges 13c connecting the electrode pads 13a and 13b. A plurality of generally quadrangular electrode pads 13b are arranged in the X-direction such that two adjacent electrode pads 13b are closest to each other at their corresponding corners. For each row, a pair of generally triangular electrode pads 13a are provided at both ends of the glass substrate 4 disposed in the X-direction so as to sandwich the associated series of generally quadrangular electrode pads 13b arranged in the X-direction. The electrode pads 13a and 13b are electrically connected in the X-direction via the associated bridges 13c.

A plurality of parallel X-direction electrodes 13 are provided above the glass substrate 4 to be arranged in the Y-direction. A line 15 is connected with the generally triangular electrode pad 13a that is located at one end of each X-direction electrode 13.

A Y-direction electrode 14 is constructed such that triangular electrode portions 14a that are generally triangular in shape and quadrangular electrode portions 14b that are generally quadrangular in shape are arranged in the Y-direction and connected in the Y-direction. That is, a Y-direction electrode 14 is constructed such that triangular electrode portions 14a and quadrangular electrode portions 14b arranged in the Y-direction such that they are closest to each other at their corresponding corners are connected via connecting portions 14c that are each in the shape of a straight line. The electrode portions 14a and 14b of each Y-direction electrode 14 are arranged in an analogous manner to that of the electrode pads 13a and 13b of each X-direction electrode 13.

A plurality of parallel Y-direction electrodes 14 are provided above the glass substrate 4 to be arranged in the X-direction. The Y-direction electrodes 14 are provided above the glass substrate 4 such that each connecting portion 14c in the shape of a straight line crosses a bridge 13c of an X-direction electrode 13. Although not shown, a bridge 13c of an X-direction electrode 13 crosses a connecting portion 14c of a Y-direction electrode 14 in a multi-level manner.

A line 15 is connected with the triangular electrode portion 14a that is located at one end of each Y-direction electrode 14.

The lines 15 include driving lines 15a connected with the associated electrode pads 13a of the X-direction electrodes 13 and detection lines 15b connected with the associated triangular electrode portions 14a of the Y-direction electrodes 14. The driving lines 15a and detection lines 15b are provided above the glass substrate 4 so as to be located outwardly of the region with the X- and Y-direction electrodes 13 and 14 as measured in a plane direction. In the implementation shown in FIG. 3, the two lines to the right are driving lines 15a, while the two lines to the left are detection lines 15b.

As shown in FIG. 2, the driving lines 15a and detection lines 15b are gathered at one location, for example, above the glass substrate 4. This makes it easy to connect the touch panel 2 with an external controller, not shown.

A black matrix layer (hereinafter referred to as BM layer) 21 is provided above the glass substrate 4 so as to surround the region in which the X- and Y-direction electrodes 13 and 14 are provided (see FIG. 3). The BM layer 21 is a light shielding layer, and is provided above the glass substrate 4 to prevent the lines 15 and other components from being visible to the viewer. That is, as shown in FIG. 3, the lines 15 are provided above the BM layer 21 provided above the glass substrate 4.

The BM layer 21 may have a thickness of 1.4 μm, for example. Preferably, the BM layer 21 has a surface resistivity of about $10^{15}$ Ω/sq, a dielectric constant of $\in = 3.4 – 16$.

The insulating resin layer 12 is provided on the X-direction electrodes 13, Y-direction electrodes 14, lines 15 and BM layer 21. The insulating resin layer 12 may be formed from a transparent resin material such as a transparent acrylic resist, for example. Covering the X-direction electrodes 13, Y-direction electrodes 14 and lines 15 with the insulating resin layer 12 prevents the X-direction electrodes 13, Y-direction electrodes 14 and lines 15 from being exposed. This prevents a short circuit in X-direction electrodes 13, Y-direction electrodes 14 or lines 15.

The insulating resin layer 12 may have a thickness of 1.5 μm, for example. Preferably, the insulating resin layer 12 has a surface resistivity of about $10^{15}$ Ω/sq, and a dielectric constant of $\in = 3.4$ or less.

The insulating resin layer 12 is fixed to the liquid crystal panel 3 by the adhesion layer 6. The adhesion layer is formed of a highly transparent adhesive for liquid crystal displays (i.e. optical clear adhesive: OCA).

A high-resistance layer 22 is provided between the adhesion layer 6 and insulating resin layer 12 to be aligned with the BM layer 21. That is, in the present embodiment, similar to the BM layer 21, the high-resistance layer 22 is provided on the insulating resin layer 12 to surround the region with the X-direction electrodes 13 and Y-direction electrodes 14 in plan view. The high-resistance layer 22 may be formed from an ink material such as carbon-based pigment ink, for example. The high-resistance layer 22 has a higher resistivity than the BM layer 21 and insulating resin layer 12.

The high-resistance layer 22 may have a thickness of 5 μm, for example. Preferably, the high-resistance layer 22 has a surface resistivity of about $10^{15}$ Ω/sq or more, and a dielectric constant of $\in = 3.4$ or less.

A conductive layer 23 is provided on the high-resistance layer 22. Although not shown, the conductive layer 23 is connected with a GND terminal (i.e. ground terminal). The conductive layer 23 is located along the periphery of the glass substrate 4 in plan view. In the present embodiment, the conductive layer 23 is provided only along the periphery of the glass substrate 4 relative to the high-resistance layer 22 in plan view of the glass substrate 4. The conductive layer 23 is covered with the adhesion layer 6 that bonds the touch panel 2 and liquid crystal panel 3.

The conductive layer 23 may be formed from Ag paste, for example. Alternatively, the conductive layer 23 may be made of Au, Al, Cu, Fe, Cr, or Ti. Preferably, the conductive layer 23 is made of a material with a resistance that is as small as possible.

Figure 4:
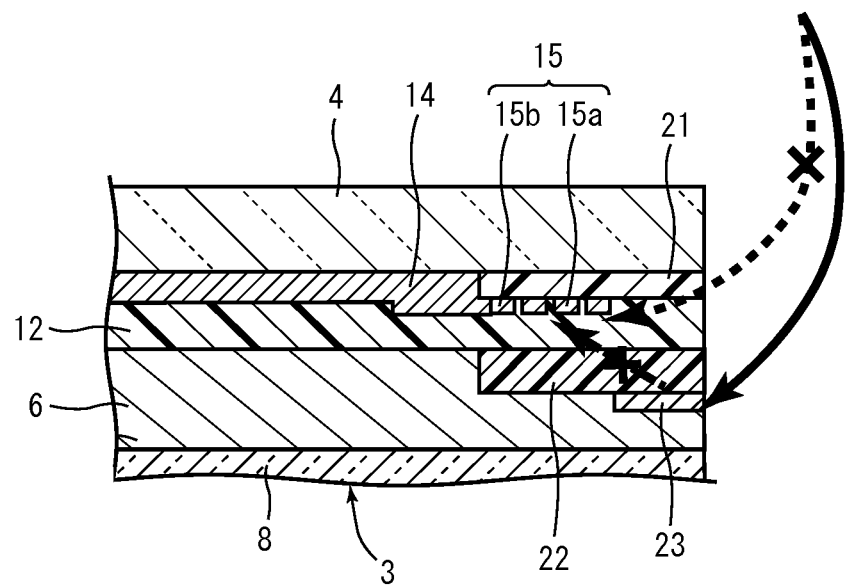
FIG. 4 illustrates how static electricity flows, similar to FIG. 3.

As indicated by a solid line in FIG. 4, the conductive layer 23 provided along the periphery of the glass substrate 4 allows static electricity entering the touch panel 2 from the outside to flow into the conductive layer 23. This prevents static electricity from flowing into X-direction electrodes 13, Y-direction electrodes 14 or lines 15 provided above the glass substrate 4, as indicated by an arrow with a broken line in FIG. 4. Preventing static electricity from flowing in X-direction electrodes 13, Y-direction electrodes 14 or lines 15 prevents a line from being broken or a short circuit from occurring with another electrode or line.

Further, the high-resistance layer 22 provided between the insulating resin layer 12 and conductive layer 23 prevents discharge from the conductive layer 23 to a line 15, as indicated by an arrow with a chain line in FIG. 4. Further, as the dielectric constant of the high-resistance layer 22 is about as small as that of the insulating resin layer 12, no coupling capacitance is produced between the conductive layer 23 and a line 15. This prevents noise or the like from flowing into a line, thereby preventing a decrease in the detection precision of the touch panel 2.

Now, results of tests in which static electricity is discharged toward a touch panel-equipped liquid crystal display device 1 having the above-described arrangement will be described.

That is, in the tests described below, static electricity was caused to flow via aerial discharge to a touch panel-equipped liquid crystal display device 1 having the above-described arrangement. The voltage of aerial discharge was changed and the voltage level at which a misrecognition, malfunction, decrease in precision or the like occurred in the touch panel 2 was measured. As used in the following description, resistance voltage means the maximum voltage level immediately before a misrecognition, malfunction, decrease in precision or the like occurred in the touch panel 2.

Aerial discharge to the touch panel-equipped liquid crystal display device 1 was conducted using a static electricity tester from Noise Laboratory Co., Ltd. (ESS-2000), where the gun was located at 5 mm or less from the surface of the touch panel 2. Aerial discharge was conducted, for each of specified voltage levels, to 9 locations above the touch panel-equipped liquid crystal display device 1 disposed in a plane direction.

Figures 5, 6:
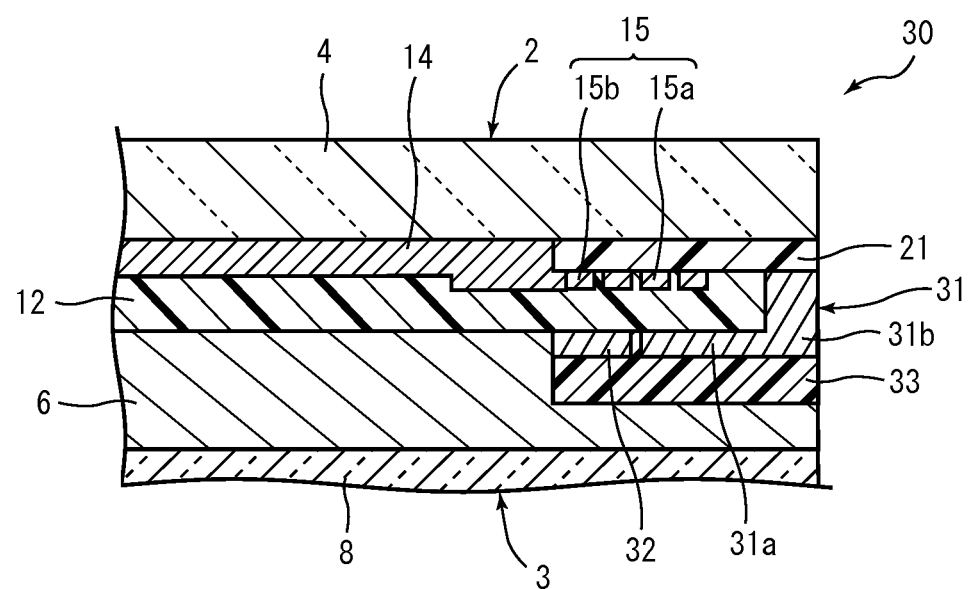
FIG. 5 illustrates results of tests using aerial discharge.
FIG. 6 is a schematic view of a touch panel-equipped liquid crystal display device according to Embodiment 2, similar to FIG. 3.

The test results are shown in FIG. 5. In an implementation without a high-resistance layer 22 and conductive layer 23 (i.e. conventional arrangement), the resistance value was 6 kV, while in the arrangement of the present embodiment, the resistance voltage was 10 kV. That is, providing the high-resistance layer 22 and conductive layer 23 of the present embodiment increased the resistance voltage for static electricity.

This is presumably because static electricity entering the touch panel-equipped liquid crystal display device 1 from the outside flows into the conductive layer 23, preventing a broken line, short circuit or the like at X-direction electrodes 13, Y-direction electrodes 14 or lines 15.

Effects of Embodiment 1

In the present embodiment, a conductive layer 23 is provided above the insulating resin layer 12 of the touch panel 2 along the periphery of the glass substrate 4. This allows static electricity entering the touch panel 2 from the outside to flow into the conductive layer 23. This prevents static electricity from flowing into X-direction electrodes 13, Y-direction electrodes 14 or lines 15 of the touch panel 2.

Moreover, the conductive layer 23 is provided above the insulating resin layer 12, the size of the picture frame region of the touch panel 2 may be reduced compared with conventional arrangements where a conductive layer is located outwardly of the region with the electrodes and lines in a plane direction. That is, stacking a conductive layer above the insulating layer such that they are arranged in their thickness direction, as in the present embodiment, reduces the size of the touch panel as measured in a plane direction compared with implementations where a conductive layer is disposed in a plane direction of the insulating layer with a distance equal to the minimum distance between the conductive layer and electrodes or lines of the present arrangement. Thus, the arrangement of the present embodiment reduces the size of the touch panel.

Further, a high-resistance layer 22 is provided between the conductive layer 23 and the resin insulating layer 12 covering the lines 15. Thus, the high-resistance layer 22 prevents static electricity flowing in the conductive layer 23 from being discharged to lines 15 beyond the resin insulating layer 12.

Further, as the conductive layer 23 is covered with an adhesion layer 6 bonding the touch panel 2 and liquid crystal panel 3, the conductive layer 23 is positioned inside the adhesion layer 6. This prevents the thickness of the touch panel-equipped liquid crystal display device 1 from increasing due to the thickness of the conductive layer 23.

Variation of Embodiment 1

In Embodiment 1, the conductive layer 23 is provided between the touch panel 2 and liquid crystal panel 3 and is covered with the adhesive layer 6. That is, the conductive layer 23 is located between the touch panel 2 and liquid crystal panel 3. Alternatively, the conductive layer 23 may be located inside the touch panel 2. More specifically, the conductive layer 23 may be located inside the insulating resin layer 12 of the touch panel 2. Still alternatively, the conductive layer 23 may be sandwiched between the insulating resin layer 12 and another insulating layer provided thereupon. Yet alternatively, the conductive layer 23 may be located above the counter-substrate 8 of the liquid crystal panel 3.

Embodiment 2

FIG. 6 schematically illustrates a touch panel-equipped liquid crystal display device 30 according to Embodiment 2. The present embodiment is different from Embodiment 1 in that conductive layer portions 31 and 32 are provided on the insulating resin layer 12 of the touch panel 2. In the following description, the components that are the same as the corresponding ones of Embodiment 1 are labeled with the same reference numerals and will not be described, and only the differences from Embodiment 1 will be described.

As shown in FIG. 6, on the insulating resin layer 12 of the touch panel 2 is provided a driving conductive layer portion 31 that overlies the driving lines 15a in the thickness direction of the touch panel 2. The driving conductive layer portion 31 includes a first conductive portion 31a located above the insulating resin layer 12 and a second conductive portion 31b electrically connected with the first conductive portion 31a and located outwardly of the insulating resin layer 12 as measured in a plane direction. That is, in the implementation shown in FIG. 6, the second conductive portion 31b is located on the side of the insulating resin layer 12. The periphery of the insulating resin layer 12 of the present embodiment is located on the glass substrate 4 inwardly of the periphery of the glass substrate 4. Thus, as shown in FIG. 6, the second conductive portion 31b covering the periphery of the insulating resin layer 12 is flush with the glass substrate 4 and other components at the edge of the periphery of the touch panel 2.

The detection conductive layer portion 32 is provided on the insulating resin layer 12 of the touch panel 2 so as to overlie the detection lines 15b in the thickness direction of the touch panel 2.

The driving conductive layer portion 31 and detection conductive layer portion 32 are formed from a transparent conductive material such as ITO, for example. Thus, the driving conductive layer portion 31 and detection conductive layer portion 32 are made of a material similar to that of the X-direction electrodes 13, Y-direction electrodes 14 and lines 15. This makes it possible to form the conductive layer at the same time as the electrodes, lines and other components, thereby reducing the manufacturing cost.

A protective layer 33 is provided on the driving conductive layer portion 31 and detection conductive layer portion 32. That is, the driving conductive layer portion 31 and detection conductive layer portion 32 are covered with the protective layer 33. This prevents the driving conductive layer portion 31 and detection conductive layer portion 32 from being exposed. The protective layer 33 may be formed from a carbon-based pigment ink, for example. The protective layer 33 may also protect other films of the touch panel 2 or improve the appearance of the touch panel 2.

Figures 7, 8:
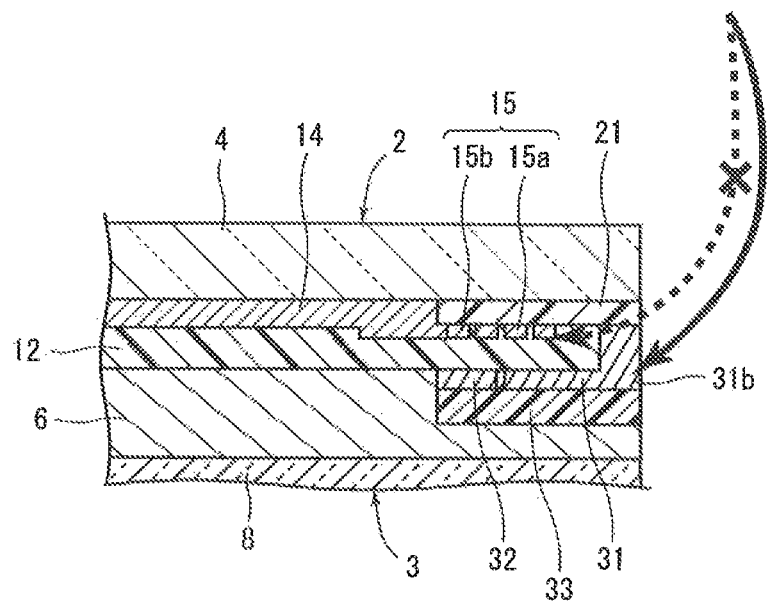
FIG. 7 illustrates how static electricity flows, similar to FIG. 4.
FIG. 8 illustrates results of tests using aerial discharge and contact discharge.

As the driving conductive layer portion 31 is provided that is located outwardly of the insulating resin layer 12 in a plane direction, static electricity entering the panel from the outside flows into the driving conductive layer portion 31, as indicated by a solid line in FIG. 7. This prevents static electricity from flowing into X-direction electrodes 13, Y-direction electrodes 14 and lines 15, as indicated by a broken line in FIG. 7, in a more reliable manner.

As the driving conductive layer portion 31 is provided to be aligned with the driving lines 15a and the detection conductive layer portion 32 is provided to be aligned with the detection lines 15b, noise is prevented from entering driving lines 15a or detection lines 15b.

Again, to determine the effects of the arrangement of the present embodiment, tests were conducted in which static electricity was discharged toward a touch panel-equipped liquid crystal display device 30 having the above-described arrangement. For the present embodiment, in addition to aerial discharge similar to that for Embodiment 1, contact discharge was conducted where discharge was conducted with the gun of the static electricity tester being in contact with the touch panel 2.

Similar to aerial discharge for Embodiment 1, contact discharge was conducted, for each of specified voltage levels, to 9 locations above the touch panel-equipped liquid crystal display device 30 disposed in a plane direction.

The static electricity tester used in the discharge tests and the test conditions for aerial discharge were the same as those of Embodiment 1.

FIG. 8 shows test results for aerial discharge and contact discharge. For aerial discharge, in a conventional arrangement without conductive layer portions 31 and 32, the resistance voltage was 6 kV, while in the arrangement of the present embodiment, the resistance voltage was 16 kV. For contact discharge, in the conventional arrangement without conductive layer portions 31 and 32, the resistance voltage was 3 kV, while in the arrangement of the present embodiment, the resistance voltage was 4 kV.

The above results demonstrate that the arrangement of the present embodiment improved the resistance voltage for both aerial discharge and contact discharge.

This is presumably because static electricity entering the touch panel-equipped liquid crystal display device 30 from the outside flows in the conductive layer portions 31 and 32, preventing a broken line, short circuit or the like at X-direction electrodes 13, Y-direction electrodes 14 or lines 15.

Effects of Embodiment 2

In the present embodiment, a driving conductive layer portion 31 and detection conductive layer portion 32 are provided on the insulating resin layer 12 of the touch panel 2. This allows static electricity entering the panel from the outside to flow into the driving conductive layer portion 31 or detection conductive layer portion 32. This prevents static electricity from flowing in X-direction electrodes 13, Y-direction electrode 14 or lines 15 of the touch panel 2.

Further, the driving conductive layer portion 31 aligned with the driving lines 15*a* and the detection conductive layer portion 32 aligned with the detection lines 15*b* are electrically separated. This prevents noise in a driving line 15*a* from affecting a detection line 15*b*, or prevents noise in a detection line 15*b* from affecting a driving line 15*a*.

Other Embodiments

Although embodiments of the present embodiment have been described, these embodiments are merely examples that may be used to carry out the present invention. Thus, the present invention is not limited to these embodiments, and may be carried out with appropriate modifications to the embodiments without departing from the spirit of the invention.

In each of the above embodiments, each of the X- and Y-direction electrodes 13 and 14 of the touch panel 2 is constructed from a combination of triangular and quadrangular electrode portions. Alternatively, each of the X- and Y-direction electrodes may be in other shapes, and may be rectangular in shape, for example.

In each of the above embodiments, the substrate of the touch panel 2 is the glass substrate 4. Alternatively, the substrate of the touch panel 2 may be a transparent substrate made of resin.

In the above embodiments, the conductive layer (portions) 23, 31 and 32 are provided along the entire periphery of the glass substrate 4 of the touch panel 2 in plan view. Alternatively, a conductive layer may only be provided in portions where X-direction electrodes 13, Y-direction electrodes 14 and lines 15 must be protected from static electricity.

In Embodiment 2 above, the driving conductive layer portion 31 includes a first conductive portion 31*a* located above the insulating resin layer 12 and a second conductive portion 31*b* located outwardly of the insulating resin layer 12 in a plane direction. Alternatively, if the detection conductive layer portion 32 is located along the periphery of the touch panel 2, the detection conductive layer portion 32 may include a first conductive portion and a second conductive portion.

INDUSTRIAL APPLICABILITY

The touch panel according to the present invention is useful as a touch panel including a plurality of lines connected with a plurality of electrodes formed above the substrate.

EXPLANATION OF REFERENCE CHARACTERS

1 touch panel-equipped liquid crystal display device
2 touch panel
4 glass substrate (substrate)
12 insulating resin layer (insulating layer)
13 X-direction electrodes (electrodes)
14 Y-direction electrodes (electrodes)
15 lines
15*a* driving lines
15*b* detection lines
22 high-resistance layer
23 conductive layer
31 driving conductive layer portion (conductive layer)
31*a* first conductive portion
31*b* second conductive portion
32 detection conductive layer portion (conductive layer)

The invention claimed is:
1. A touch panel comprising:
a substrate;
a plurality of electrodes above the substrate;
wiring lines above the substrate and each electrically connected to one of the plurality of electrodes;
an insulating layer covering the electrodes and the wiring lines;
a conductive layer above the insulating layer and connected to a ground to collect static electricity entering the touch panel from an outside and transmit the static electricity to the ground; and
a high-resistance layer between the insulating layer and the conductive layer, the high-resistance layer having a surface resistivity of $10^{15}$ Ohms/sq or more.
2. The touch panel according to claim 1, wherein the conductive layer is provided along a periphery of the substrate.
3. The touch panel according to claim 2, wherein the conductive layer includes a first conductive portion located above the insulating layer and a second conductive portion electrically connected with the first conductive portion and located outwardly of the insulating layer in a plane direction thereof.
4. The touch panel according to claim 1, wherein
the wiring lines include driving lines and detection lines, the conductive layer includes a driving conductive layer portion overlying the driving lines in a plan view and a detection conductive layer portion overlying the detection lines, and the driving conductive layer portion and the detection conductive layer portion are electrically independent from each other.

5. The touch panel according to claim 1, wherein the substrate is a protective plate located at an operation surface.

6. The touch panel according to claim 1, wherein a resistance of the high-resistance layer is equal to or higher than that of the insulating layer.

7. The touch panel according to claim 1, wherein a dielectric constant of the high-resistance layer is as small as that of the insulating layer.

8. The touch panel according to claim 1, wherein a dielectric constant of the high-resistance layer is 3.4 or less.

9. The touch panel according to claim 1, further comprising:
a light shielding layer between the substrate and the lines, wherein
a surface resistivity of the high-resistance layer is equal to or higher than that of the light shielding layer.

10. The touch panel according to claim 1, wherein the high-resistance layer is provided above the insulating layer so as to surround the electrodes in a plan view.

11. The touch panel according to claim 1, further comprising:
a light shielding layer provided between the substrate and the lines so as to surround the electrodes in a plan view, wherein
the high-resistance layer is above the insulating layer so as to surround the electrodes in the plan view and aligned with the light shielding layer.

* * * * *